United States Patent
Lidström et al.

(10) Patent No.: US 9,247,048 B2
(45) Date of Patent: Jan. 26, 2016

(54) METHOD AND APPARATUS FOR PROVIDING CUSTOMISED SERVICES IN A COMMUNICATION NETWORK

(75) Inventors: Mattias Lidström, Stockholm (SE);
Theo Gerrit Kanter, Rönninge (SE);
Johan Hjelm, Tokyo (JP)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1031 days.

(21) Appl. No.: 12/599,611

(22) PCT Filed: May 10, 2007

(86) PCT No.: PCT/SE2007/000454
§ 371 (c)(1),
(2), (4) Date: Apr. 16, 2010

(87) PCT Pub. No.: WO2008/140358
PCT Pub. Date: Nov. 20, 2008

(65) Prior Publication Data
US 2010/0222039 A1    Sep. 2, 2010

(51) Int. Cl.
*H04M 3/487* (2006.01)
*H04L 29/08* (2006.01)
(Continued)

(52) U.S. Cl.
CPC ........... *H04M 3/42136* (2013.01); *G06Q 30/02* (2013.01); *H04L 67/327* (2013.01); *H04M 3/42178* (2013.01); *H04M 3/4878* (2013.01); *H04M 2203/2038* (2013.01)

(58) Field of Classification Search
CPC ... H04W 4/02; H04W 4/025; H04W 52/0251; H04W 4/26; H04W 48/18; H04W 4/00; H04W 4/028; H04W 4/206; H04L 67/327; H04M 3/4878; H04M 3/42136; H04M 2203/2038; H04M 3/42178; G06Q 30/02

USPC ........ 455/414.1, 456.3, 405, 406, 418, 456.1, 455/456.2; 707/104.1, 737; 705/14.64, 705/14.53, 14.54, 37, 14.23, 14.45, 14.55, 705/14.57, 14.66, 304, 41, 7.31
See application file for complete search history.

(56) References Cited

U.S. PATENT DOCUMENTS

2002/0188589 A1* 12/2002 Salmenkaita et al. ............ 707/1
2004/0176958 A1*  9/2004 Salmenkaita et al. ........ 704/275
2005/0246292 A1* 11/2005 Sarcanin ........................ 705/67

FOREIGN PATENT DOCUMENTS

JP      2005-196676 A    7/2005
WO   WO 2006/115442 A1  11/2006

OTHER PUBLICATIONS

Sun Young Lee et al: "Service Composition Techniques Using Data Mining for Ubiquitous Computing Environments"; IJCSNS International Journal of Computer Science and Network Security, vol. 6 No. 98, Sep. 2006. Retrieved from the internet: http://paper.ijcsns.org/07_bookI2006091200609B16.pdf Summary, Section 3, Section 4.2.

(Continued)

*Primary Examiner* — Dinh P Nguyen
(74) *Attorney, Agent, or Firm* — Roger S. Burleigh (57) ABSTRACT

A method and apparatus for offering a service to at least one client in a communication network for a specific client context, by means of a service provisioning unit. A history of client activities involving service usage in associated client contexts, is recorded in an activity database. Service templates are composed for associated client contexts based on the recorded history of client activities. When a context detector detects that the specific client context prevails, a service configurator selects a service template for the detected client context and configures a customised service from the selected service template. The customised service can then be offered to the at least one client.

26 Claims, 2 Drawing Sheets

(51) Int. Cl.
*G06Q 30/02* (2012.01)
*H04M 3/42* (2006.01)

(56) References Cited

OTHER PUBLICATIONS

Mostefaoui, S Ketal: "Context aware service provisioning", Jul. 19-23, 2004 The IEEE/ACS International Conference on Pervasive Services, 2004. Sections 2, 3.2, 4.1. 4.3, 4.4, figure 1, abstract.

Chaari T. et al. Modeling and Using Context in Adapting Applications to Pervasive Environments. 2006 ACS/IEEE International Conference on Pervasive Services, Jun. 26-Jun. 29, 2006, pp. 111-120, XP031099911.

Kammanahalli, H. et al. Context Aware Retrieval in Web-Based Collaborations. Proceedings of the Second IEEE Annual Conference on Pervasive Computing and Communications Workshops, 2004. Mar. 14-17, 2004.

* cited by examiner

METHOD AND APPARATUS FOR PROVIDING CUSTOMISED SERVICES IN A COMMUNICATION NETWORK

TECHNICAL FIELD

The present invention relates generally to a method and apparatus for making services available to clients in a communication network. In particular, the invention is concerned with creating and offering new customised services adapted to the prevailing circumstances.

BACKGROUND

With the emergence of 3G mobile telephony, new packet-based communication technologies using IP (Internet Protocol) have been developed to support wireless communication of multimedia. For example, communication protocols in GPRS (General Packet Radio Service) and WCDMA (Wideband Code Division Multiple Access) support packet-switched multimedia services, as well as traditional circuit-switched voice calls. New services are also constantly developed for both mobile and fixed users to increase the field of usage for their communication devices. It is also very useful to understand the needs and interests of users in different environments in order to create and offer services that are relevant and potentially interesting for the users in the prevailing circumstances.

A service and service-delivery control architecture called "IP Multimedia Subsystem" (IMS) has been developed by the $3^{rd}$ Generation Partnership Project (3GPP) as a platform for handling multimedia services and sessions in the packet domain, based on IP transport. Thus, an IMS network can be used to initiate and control multimedia sessions for any fixed or mobile IP enabled terminals connected to any type of access networks.

Invoked multimedia services are enabled and executed by various application servers, either servers within the IMS network or external servers controlled by "third party" service providers. The sessions are controlled by various session managing nodes in the IMS network, and a database element HSS (Home Subscriber Server) stores subscriber and authentication data for subscribing clients. IMS is mentioned in this description for illustrative purposes only, although the present invention is not limited to using an IMS network. The advent of IMS has greatly fuelled the development of multimedia-based services.

Among other things, presence services have been introduced involving the publishing of presence data of clients to become available to other clients and applications. Presence data may indicate the behaviour of a client in some respect by basically defining the state or situation of the client and his/her equipment, commonly referred to as "device". The presence data or client state may include a client status, a device status, the geographic location, device capabilities, and other personal client information such as interests, occupations, personal characteristics, moods, etc.

Recently, a concept has also been developed to provide refined or adapted information on communication clients, e.g. to increase the usability of applications for invoked services depending on the client's current situation or behaviour. This concept is generally referred to as the distribution of "context" information, which may be implemented by using similar mechanisms as for the above-described presence services. It is desirable to develop "context-aware" applications to achieve services optimally adapted to the prevailing circumstances. The context information reflecting the client's situation can thus be shared in client groups in the same manner as presence data, or be used to create an optimal service.

A context server may be used to collect information on the client by receiving client data from various sources, such as "sensors" or the like adapted to measure or register various variables or the like characterising the current state, status or situation of the client. For example, sensors may be arranged to measure physical characteristics such as temperature and movements, or to register device activities or any of the client states mentioned above for presence services. Hence, the above-described context information and the presence data of a client actually reflect the behaviour of that client in some respect, e.g. in terms of device usage and geographic whereabouts.

Figure 1:
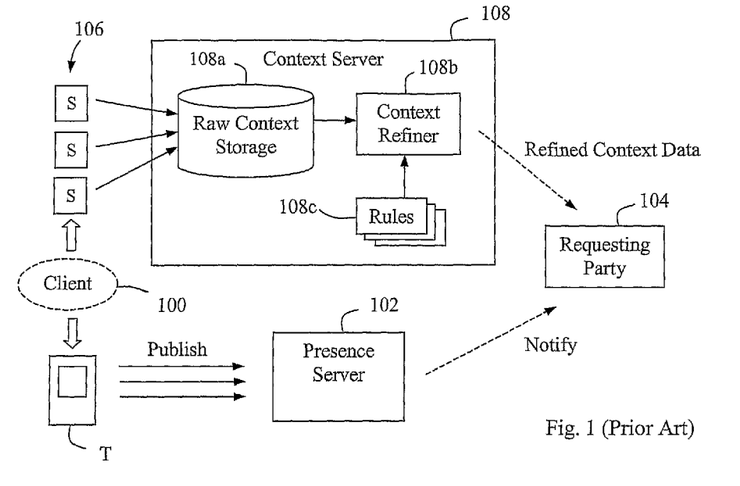
FIG. 1 is a block diagram illustrating mechanisms for providing presence data and context data for a communication client to a requesting party, according to the prior art.

The currently available mechanisms for providing presence data and context data for a client of interest to a requesting party are illustrated schematically in FIG. 1. The client of interest 100 is a user of a mobile terminal T, or a software agent implemented therein, for which various event publications are sent to a presence server 102, either from the terminal itself or from the communication network used, as described above. The presence server 102 may in turn send notifications to the requesting party 104, e.g. a subscribing client, regarding current presence data.

In addition or alternatively, one or more sensors 106 may be arranged as described above to provide raw context data to a context server 108, the data being received and stored in a context storage unit 108a. The shown sensors 106 may also represent functions reflecting client activities in the terminal T or in the used network, not shown. Moreover, existing routines in the communication network for, e.g., generating call data records for clients can also be used to provide context data.

The stored raw data may then be processed and refined in a context refiner 108b by applying predefined rules 108c on the raw data, in order to derive or calculate new refined context information from the raw data. The predefined rules 108c may include algorithms or the like that calculate certain parameters, draw conclusions or create compilations from the raw data.

The refined context can then be distributed to the requesting party 104 according to conventional routines, not described here further. A policy for controlling the context distribution may also have been defined basically by the "context owner", who may be a network operator or the client 100 himself/herself. The policy may dictate the extent of availability of the context data to requesters, or that a particular requester is allowed to receive only some part of the available context data, etc. It should be noted that the requesting party 104 may obtain a subscription to receive context information from the context server 108 on a more or less continuous basis, i.e. in a similar manner as for the presence data.

Typically, the context information pertains to an individual client who has a certain profile as defined by his/her current context. However, a client may also belong to an established group of clients, having an aggregate profile shared by its members. For example, members of a family group may have individual contexts while the family may have a common context with an aggregate profile shared by its members, whereas another group specifically interested in, e.g., football games may have a completely different profile.

WO 06/115442 discloses a mechanism where the particular needs of a requesting group of clients can be met by providing relevant context information regarding a specific object of interest, which information has been adapted to particular requirements and needs of the group. In this solution, a "customised" rule can be created for the requesting group defining conditions when requesting for refined context information. An aggregated context function creates an aggregated context for the group by collecting individual context data for each of the group's members, in order to create the customised rule valid for the group. The customised rule is sent to a context server (which may be configured basically as the context server 108 in FIG. 1) as an adapted request for refined context information on the object of interest. The context server then refines raw context data according to the customised rule and delivers the refined context data in response to the request.

It is thus common to form groups with plural members having mutual interests in some respect, in order to share information between the members by using any of the above-described mechanisms for presence services and client contexts.

When service providers offer various services to individual clients and groups of clients, e.g. by means of advertising, the services have typically been created on a more or less fixed basis requiring a certain amount of time and effort. In that case, the service and its parameters can be adapted to relatively static factors only due to the time it takes before it can be offered to clients. The service parameters therefore remain mostly unchanged throughout the lifetime of the service. Further, the clients have no possibilities to influence the character or nature of the services and must be content to select from the available services as they are offered by the service providers. The process of creating and configuring a service is often referred to as "service provisioning", which term will be used in the following.

As mentioned above, mechanisms have been developed for context-aware services that can be adapted to the environment and/or the client's current situation or behaviour, e.g. in a request-triggered manner as described in afore-mentioned WO 06/115442. For example, a particular offered service can be configured differently depending on whether the clients are located in a quiet village in daytime or in a bustling city centre at night. Thus, the service parameters may vary during the lifetime of such context-aware services.

However, it is not always possible to determine or detect the specific needs or interests of individual clients or groups of clients in particular prevailing circumstances, even if great amounts of sensor information are available. The services that are offered may therefore be of limited relevance and interest for some clients in some situations.

SUMMARY

The object of the present invention is to address the problems outlined above. It is thus generally desirable for both service providers and clients in a communication network to obtain better attraction and relevance of offered services. This object and others can be achieved by providing a method and apparatus for offering a service to at least one client in a communication network for a specific client context, according to the attached independent claims.

In the method according to one aspect of the invention, service templates are composed for associated client contexts based on a recorded history of client activities involving service usage in the associated client contexts. When it is detected that the specific client context prevails, a service template is selected from the composed service templates for the specific client context. A customised service is then configured from the selected service template, and the customised service is offered to the at least one client.

The inventive method may be implemented in different possible embodiments, e.g. according to the following. The offered customised service may comprise a series of combined sub-services that can be offered when the at least one client requests one of said sub-services. The recorded history of client activities may further include the usage of said series of combined sub-services and the client context in which they were used.

The specific client context may further comprise environmental conditions, such as location, the weather, the time of day, week and/or season, and ambient characteristics such as light and sounds.

The selected service template can be composed further based on client behaviour stored in a profile system or derived from previous service requests. The selected service template may be composed for an individual client or for a group of clients. The service template may also be composed based on the behaviour of a specific group of clients and the customised service may then be offered to at least one individual client, or vice versa. The selected service template can be valid for a plurality of different client contexts.

The specific client context may be detected to prevail by means of sensors providing raw context data related to activities of the at least one client. The history of client activities can be recorded in a limited area such as a cell, an ADSL RACS or a WLAN hotspot, by sniffing traffic in said limited area.

Further, the history of client activities can be recorded by logging the activities in an activity database comprising at least one of: a repository for anonymous client data, a repository for pseudonymous client data, and a repository for personal client data. When service templates are composed from the information in the repository for anonymous client data, customised services configured therefrom can be offered to any clients. When service templates are composed from the information in the repository for pseudonymous client data, customised services configured therefrom can be offered to clients of specific categories. When service templates are composed from the information in the repository for personal client data, customised services configured therefrom can be offered to specific individual clients or client groups.

Different composed service templates may be scored from the results of service usage when the corresponding customised services are offered. The customised service may further be offered if its associated client context parameters are fulfilled by a predetermined percentage, e.g. at least by 70% or the like.

In the apparatus according to another aspect of the invention, a service provisioning unit comprises an activity database for recording a history of client activities involving service usage in associated client contexts. The service provisioning unit further comprises means for composing service templates for associated client contexts based on the recorded history of client activities, a context detector adapted to detect that said specific client context prevails, a service configurator adapted to select a service template from the composed service templates for the specific client context and to configure a customised service from the selected service template, and means for offering the customised service to the at least one client.

The inventive service provisioning unit may be implemented in different possible embodiments, e.g. according to the following. The service offering means may be adapted to offer a series of combined sub-services when the at least one client requests one of the sub-services.

The service template composing means may be adapted to compose the selected service template further based on client behaviour stored in a profile system or derived from previous service requests. The service template composing means may also be adapted to compose the selected service template for an individual client or for a group of clients. The service template composing means may be further adapted to compose the selected service template based on the behaviour of a specific group of clients, and the service offering means may then be adapted to offer the customised service to at least one individual client, or vice versa.

The context detector may be adapted to detect that the specific client context prevails by means of sensors providing raw context data related to activities of the at least one client.

The activity database may be adapted to record the history of client activities in a limited area such as a cell, an ADSL RACS or a WLAN hotspot, by sniffing traffic in said limited area.

The activity database may further comprise at least one of: a repository for anonymous client data, a repository for pseudonymous client data, and a repository for personal client data. The service template composing means may then be adapted to compose service templates from the information in the repository for anonymous client data, for configuring customised services that can be offered to any clients. The service template composing means may also be adapted to compose service templates from the information in the repository for pseudonymous client data, for configuring customised services that can be offered to clients of specific categories. The service template composing means may also be adapted to compose service templates from the information in the repository for personal client data, for configuring customised services that can be offered to specific individual clients or client groups.

Further preferred features and benefits of the present invention will become apparent from the detailed description below.

BRIEF DESCRIPTION OF THE DRAWINGS

The present invention will now be described in more detail by means of preferred embodiments and with reference to the accompanying drawings, in which.

DETAILED DESCRIPTION

Briefly described, the present invention provides a solution for creating and offering customised services in a communication network based on previous recorded client behaviour in specific situations and environments, according to recorded context parameters that may include the location, time and ambient characteristics. The offered services can then be customised and adapted for specific needs or interests of individual clients or groups of clients anticipated in particular prevailing circumstances, here referred to as client contexts. The customised services may involve delivery of multimedia content from a service provider, e.g. in order to sell content, advertise, announce, entertain, or provide information.

In this solution, activities of clients or groups of clients during prevailing client contexts in the communication network are recorded over time to accumulate a history of client activities associated with the different prevailing client contexts. A customised service can then be created or composed for an associated client context based on the recorded history of client activities in that client context. The customised service will thus be composed by taking into account the previous behaviour of clients in the associated client context. The new customised service can finally be offered by a service provider to a client or group of clients when the associated client context is detected to prevail.

If a certain client behaviour typically occurs in a certain context, that behaviour can thus be anticipated whenever the associated client context is detected to prevail, and the customised service be composed to satisfy that behaviour in a forestalled or foreseen manner. By way of example, it may turn out that certain clients in a certain area have a tendency to visit museums at rainy weather. A relevant customised service may then be composed to provide museum information to such clients in that area, and possibly also to other potential clients e.g. with similar interests, particularly whenever it rains.

A customised service can also include a series of subservices according to a typical previously recorded client behaviour of utilising a combination of individual services in a sequence. For example, some clients at a certain location may typically first check the weather forecast, then the opening times and admission prizes of one or more specific entertainment venues, and finally buy tickets to a selected venue. This behaviour can be anticipated and forestalled by offering a customised service to clients in that area composed of the sub-services of providing information on the weather, opening times and admission prizes, and finally an on-line payment service for buying tickets. If a client requests a certain service, the service provider may automatically offer a feasible series of sub-services according to a customised service starting with the requested sub-service. The sub-services in a customised service can thus be offered as an "activity macro" or the like, i.e. a preconfigured or predetermined sequence or set of services, when the client requests one of the sub-services.

Using the present invention, it may be possible to offer a customised service to a certain category of clients, e.g. persons of a certain age, sex, occupation, specific interests, etc., depending on the previous behaviour of that client category. It is also possible to offer a customised service to a specific individual client or client group, depending on the previous behaviour of that client or client group.

Figure 2:
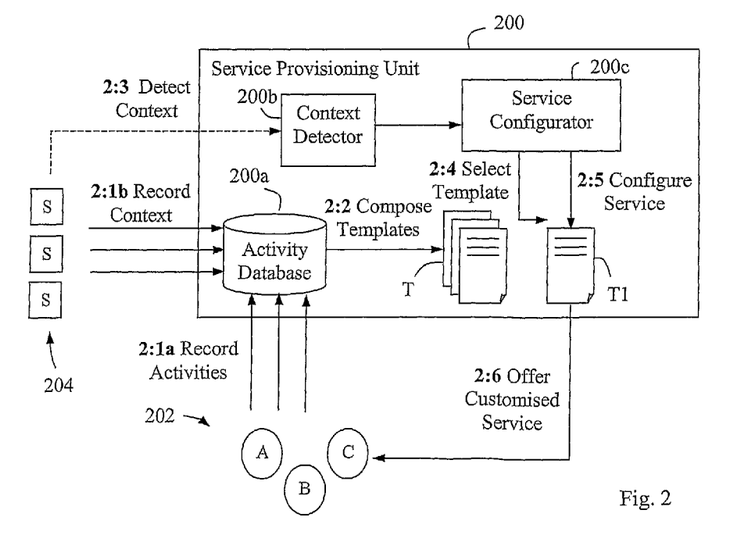
FIG. 2 is a schematic block diagram illustrating a procedure for offering customised services by means of a service provisioning unit in a communication network, according to one embodiment.

FIG. 2 illustrates an exemplary procedure for creating customised services in a communication network, according to one feasible embodiment. In general terms, the procedure is executed by means of a service provisioning unit 200 that can be accessed and utilised by various service providers. The term "service provisioning unit" will thus be used in the following, although it may alternatively be called a "service creating unit", or "service offering unit", or any similar functional term.

The service provisioning unit 200 may be implemented to cover a more or less limited area in a communication services network, e.g. a cell in a cellular mobile network, an ADSL (Asymmetrical Digital Subscriber Line) RACS (Resource and Admission Control Subsystem), a WLAN (Wireless Local Area Network) hotspot, or similar. It should be noted that the procedure is merely shown schematically, and it can be implemented in different ways in practice not limited to the shown arrangement of functional units.

A plurality of clients A, B, C . . . denoted 202 habitually perform various activities of service usage in the communication network or limited coverage area, which are continually recorded in an activity database 200a in the service provisioning unit 200, as illustrated by a step 2:1a. The client activities may be detected by means of different "activity sensors" or the like, not specifically shown here, which may be attached to the clients' terminals or installed in the communication network in an appropriate manner.

A plurality of "context sensors" S denoted 204 provide context information which is also continually recorded with the client activities in the activity database 200a, as illustrated by a simultaneous step 2:1b. The context sensors may generally reflect various environmental factors, such as location, weather, ambient characteristics such as light or sounds, time of day, week and season, etc. In addition to the contextual parameters related to environmental factors, it is also possible, but not necessary for the performance of the present invention, to also record more client specific parameters together with the client activities, such as presence information and user preferences. Recording this extra information may thus further improve the relevance of offered services, although it may sometimes be sufficient to record the client activities and associated environmental contexts.

In the activity database 200a, the recorded client activities are thus associated with certain contexts prevailing when the client activities were recorded. In this way, a history of client activities and associated client contexts is built up over time such that typical or anticipated client behaviours in certain contexts can be identified from the recorded history of client activities. The history of client activities may be recorded in the considered area, e.g. by "sniffing" the traffic in that area, i.e. detecting various messages and requests in the traffic according to prevailing protocols. It is assumed that the skilled person is capable of making such registrations of client activities, which is therefore not necessary to describe here any further.

A next step 2:2 illustrates that templates T for customised services are created or composed based on the recorded history of client activities for specific contexts, as lodged in the activity database 200a. The customised services can then be composed in adaptation of anticipated client behaviours, as described above. A service template may be composed further based on a client behaviour stored in a profile system or derived from previous service requests.

A service template T may include different optional service parameters and/or operational descriptions to be set according to certain conditions when configuring a customised service. The service template may be generic as valid for any clients, or specifically valid for a certain client category, a certain individual client or a certain group of clients, which will be described in more detail below with reference to another feasible embodiment shown in FIG. 4.

A context detecting function 200b, here called "Context Detector", in service provisioning unit 200 is adapted to detect different client contexts by means of the sensors 204, as illustrated by a step 2:3. When a specific client context is detected, a service configuring function 200c, here called "Service Configurator", selects a service template T1, in a following step 2:4, from the set of service templates T, that is associated with or valid for the detected context.

The service configurator 200c then configures a customised service from the selected service template T1, in a following step 2:5. Configuring the service typically includes selecting and applying various service parameters and/or operational descriptions as outlined in the template and according to the prevailing detected client context. For example, an activity macro may be applied if the service includes a series of sub-services as described above.

In a last shown step 2:6, the customised service is finally offered to one or more clients 202 subjected to the detected client context. The described service provisioning unit 200 may be owned, controlled and/or accessed by one or more service providers, not shown, who can utilise it for technically creating and offering customised services in the manner described above. Various different business models for controlling and operating the service provisioning unit 200 are possible to employ, although lying outside the scope of the present invention.

As mentioned above, specific clients or a certain category of clients may be the target for the service offer, which may depend on preconditions or recommendations defined for the selected service template. For example, a certain service template may dictate that the service is specifically attractive for female teenagers, or for any persons interested in sports or in music.

In this way, the set of service templates T is being composed and predefined in advance in preparation to an anticipated client behaviour, which may be well before they are actually configured and offered as customised services to clients when associated contexts occur. It should be noted that a certain service template T may be relevant for plural different client contexts, and plural service templates may also be relevant for the same client context. The present invention is thus not limited in this respect. For example, a subset of service templates may be listed in the service provisioning unit 200 as possible activities in a specific area, for certain clients, or during a certain season, and so forth.

Of course, new service templates T can be composed, and old ones can be modified and updated or deleted as the activity database 200a is built up and behavioural patterns change over time. For example, one or more new service templates can be composed based on an existing old one. Old activity registrations and associated contexts may also be deleted from the activity database 200a, e.g. after a predefined expiry period or similar, although the service template(s) composed therefrom may be saved.

Using this solution, a service template can be quickly selected and applied, or "loaded", to configure and form a customised service as soon as its associated context is detected. Thereby, highly relevant customised services can be offered "just in time" with a minimum of delay as soon as the applicable situations occur. Moreover, a service template can be composed and used even before the context and typical behavior of the clients are fully known, which will further speed up the delivery of relevant services. The template can then be modified and improved in "real-time", or developed into plural templates, depending on the continual behavior of the clients.

It is also possible to score different service templates from the results of service usage when the corresponding customised services are offered, e.g. offering a service according to template T1 results in 60% usage, template T2 results in 50% usage, etc. Further, it is possible to offer a customised service if its associated client context parameters are fulfilled by a predetermined percentage, e.g. by at least 70%, and so forth.

Figure 3:
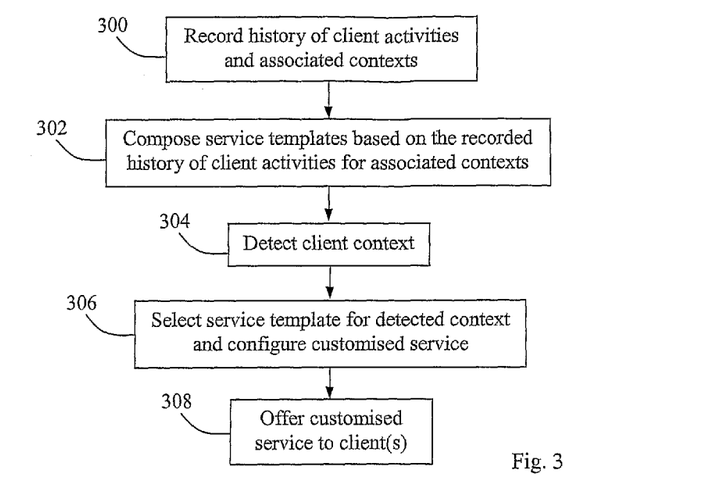
FIG. 3 is a flow chart illustrating the basic steps for offering a customised service to one or more clients, according to another embodiment.

In FIG. 3, a flow chart is shown comprising steps in a procedure for offering a customised service to one or more clients, according to another embodiment. The steps are basically executed by a service provisioning unit or the equivalent, e.g. according to the example of FIG. 2. In a first step 300, a history of client activities and associated client contexts are recorded more or less continually over a prolonged period of time by recording client activities involving the usage of services in a communication network at prevailing client contexts. This step basically corresponds to steps 2:1*a* and 2:1*b* in FIG. 2.

In a next step 302, service templates are composed based on the recorded history of client activities for associated client contexts. This step corresponds to step 2:2 in FIG. 2. In a further step 304, a certain client context is detected, implying an opportunity to offer one or more relevant services associated with the detected client context. This step basically corresponds to step 2:3 in FIG. 2.

In a following step 306, a service template is selected for the detected client context and a customised service is configured from the selected service template. This step basically corresponds to step 2:4 in FIG. 2. Of course, more than one service template can be selected that are associated with the detected client context. Finally, the customised service is offered to one or more clients that are subject to the detected client context, in a last shown step 308.

Figure 4:
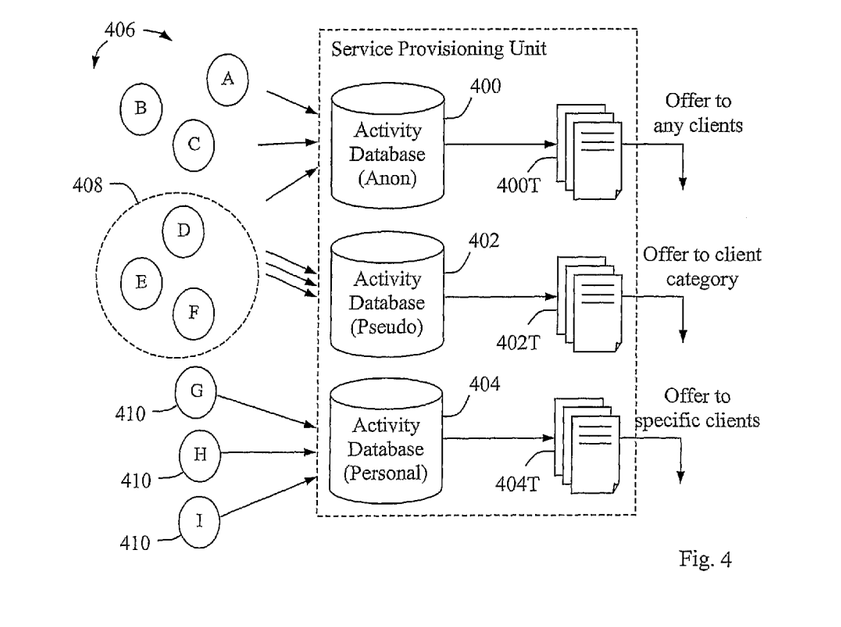
FIG. 4 is a schematic block diagram of differentiated activity databases in a service provisioning unit, according to another embodiment.

As mentioned above, service templates can be composed that are either generic for any clients, or specifically valid for a client category, a certain individual client or a certain group of clients. FIG. 4 illustrates schematically a service provisioning unit that is adapted to compose such different types of service templates. The service provisioning unit of FIG. 4 comprises an activity database including plural activity sub-databases or repositories for different clients.

A first activity sub-database 400 is a repository for anonymous client data, thus holding information on activities of any clients 406 that have performed some activity in the given contexts. The activity information in database 400 is thus wholly anonymous and represents the largest population of client information in the service provisioning unit. The activity history accumulated in database 400 can be used to compose service templates valid for, e.g., a statistical average of all clients and/or activities.

A second activity sub-database 402 is a repository for pseudonymous client data thus holding information on activities of clients 408 belonging to certain client categories, including clients with specific interests or other characteristics, such as people of a certain age interested in a certain topic, e.g., music or sports. For example, a client may be considered to be a pseudonymous client depending on his/her registered preferences and settings.

A third activity sub-database 404 is a repository for personalised client data holding information on activities of specific individual clients 410 or client groups, which is wholly private and not accessible to others.

In the figure, any of the shown clients A-I 406, 408 and 410 may contribute with activities in the first activity sub-database 400 for anonymous data.

From the information in the first activity sub-database 400, service templates 400T are composed for configuring generic customised services that can be offered basically to any clients. From the information in the second activity sub-database 402, service templates 402T are composed for configuring customised services specifically adapted for certain client categories that can be offered to clients in the respective categories. From the information in the third activity sub-database 404, service templates 404T are composed for configuring personalised customised services that should be offered only to those individual clients or client groups 410 that have contribute with activities in the third activity database 404 for personalised data.

Some advantages that may be obtained when using the present invention are:

The ability to create new relevant and attractive services and service patterns based on anticipated client behaviour and needs, and to be able to provision and configure these in a simple manner for individual clients and/or groups of clients.

Value is added for the clients by providing more relevant activities and allowing the clients to control their own activities.

The ability to dynamically discover client interests in this way gives service providers the ability to frequently improve and expand previously used services.

The ability to organise and combine existing services to provide added value for the end user as well as service providers (by increasing the services usage). For example, a pattern for how to use existing web services can be offered to the user as a recommended activity macro.

Personalized activities and advertisements can be obtained.

The inventive solution also enables the possibility to provide personalised advertisements, based on a selected and/or recommended activity together with personal data of a client. Suitable advertisements can then be displayed to a requesting client, and the advertisements may be based on user profile data, as well as logged activity data and location data. The service templates may thus be derived from registered client activities in the form of user interactions, and when user interactions occur in a certain client context, the service templates can be attached to that context. The client contexts can be derived in the same way as the templates above.

An example, of how a service template for an IPTV service and the associated client context for a specific client can be derived, is as follows:

A set of sensors are arranged on a set top box for TV. The sensors can be used to detect a context, e.g. ambient light, persons present in the room, objects present on the table etc. During different sets of context, different programs are being watched. Service templates are then created based on client activities including the programmes watched and services used. These service templates can be selected when the associated contexts are detected as prevailing, and the provisioning of services according to the service template can be made rapidly.

By analysing the client behaviour in this way, the best mechanism to promote the new services can also be discovered. For example, if clients frequently use a football betting service, watch the Arsenal TV and Premier league Live Chat, it would be feasible to offer these services together as a series of sub-services in a bundled concept.

While the invention has been described with reference to specific exemplary embodiments, the description is generally only intended to illustrate the inventive concept and should not be taken as limiting the scope of the invention. The present invention is defined by the appended claims.

The invention claimed is:

1. A method of creating and offering a service to at least one client in a communication network, comprising the steps of:
   recording a history of client activities and associated client contexts by recording over time client activities involving a usage of services in a communication network at prevailing client contexts, wherein the history of client activities is recorded by logging the client activities in an activity database comprising at least one of: a repository for anonymous client data, a repository for pseudonymous client data, and a repository for personal client data;

composing service templates for associated client contexts based on the history of client activities, the service templates including service parameters and/or operational descriptions to be set when configuring customised services, wherein the service templates are composed from information in a repository for anonymous client data for any clients, information in a repository for pseudonymous client data for clients of specific categories, or information in a repository for personal client data for specific individual clients or client groups;

detecting that a specific client context prevails for the at least one client, implying an opportunity to offer one or more relevant services associated with the specific client context;

selecting a selected service template from the service templates for the specific client context as soon as the specific client context is detected, the selected service template being associated with or valid for the specific client context;

configuring a customised service from the selected service template, by loading the selected service template by setting the service parameters and/or operational descriptions in the selected service template according to the specific client context, wherein the customised service comprises a series of combined sub-services according to previous client behavior of utilizing a combination of individual services according to a temporal sequence of the combination of individual services by the at least one client at a certain location; and, offering the customised service to the at least one client subjected to the specific client context.

2. The method according to claim 1, wherein the series of combined sub-services is an activity macro.

3. The method according to claim 1, wherein the series of combined sub-services is offered when the at least one client requests one of the sub-services.

4. The method according to claim 1, wherein the history of client activities includes a usage of the series of combined sub-services and an associated client context.

5. The method according to claim 1, wherein the specific client context comprises environmental conditions, including at least one of: location, weather, time of day, week and/or season, and ambient characteristics.

6. The method according to claim 1, wherein the selected service template is composed based on client behaviour stored in a profile system or derived from previous service requests.

7. The method according to claim 1, wherein the selected service template is composed for an individual client or for a group of clients.

8. The method according to claim 1, wherein the selected service template is composed based on client behaviour of a specific group of clients, and the customised service is offered to at least one individual client.

9. The method according to claim 1, wherein the selected service template is composed based on client behaviour of at least one individual client, and the customised service is offered to a specific group of clients.

10. The method according to claim 1, wherein the selected service template is valid for a plurality of different client contexts.

11. The method according to claim 1, wherein the specific client context is detected to prevail by means of sensors providing raw context data related to the client activities of the at least one client.

12. The method according to claim 1, wherein the history of client activities has been recorded in a limited area by sniffing traffic in the limited area.

13. The method according to claim 1, wherein different service templates are scored from results of service usage when corresponding customised services are offered.

14. The method according to claim 1, wherein the customised service is offered if associated client context parameters are fulfilled by a predetermined percentage.

15. A service provisioning unit adapted to create and offer a service to at least one client in a communication network, comprising:

memory adapted to record a history of client activities and associated client contexts by recording over time client activities involving a usage of services in a communication network at prevailing client contexts, wherein the history of client activities is recorded by logging the client activities in an activity database comprising at least one of: a repository for anonymous client data, a repository for pseudonymous client data, and a repository for personal client data; and a processor with the memory adapted to cause the service provisioning unit to perform at least the following:

compose service templates for associated client contexts based on the history of client activities, the service templates including service parameters and/or operational descriptions to be set when configuring customised services, wherein the service templates are composed from information in a repository for anonymous client data for any clients, information in a repository for pseudonymous client data for clients of specific categories, or information in a repository for personal client data for specific individual clients or client groups;

detect that a specific client context prevails for the at least one client, implying an opportunity to offer one or more relevant services associated with the specific client context;

select a selected service template from the service templates for the specific client context as soon as the specific client context is detected, the selected service template being associated with or valid for the specific client context, and to configure a customised service from the selected service template, by loading the selected service template by setting the service parameters and/or operational descriptions in the selected service template according to the specific client context, wherein the customised service comprises a series of combined sub-services according to previous client behavior of utilizing a combination of individual services according to a temporal sequence of the combination of individual services by the at least one client at a certain location; and, offer the customised service to the at least one client subjected to the specific client context.

16. The service provisioning unit according to claim 15, wherein the series of combined sub-services is an activity macro.

17. The service provisioning unit according to claim 15, wherein the processor is adapted to offer the series of combined sub-services when the at least one client requests one of the sub-services.

18. The service provisioning unit according to claim 15, wherein the history of client activities includes a usage of the series of combined sub-services and an associated client context.

19. The service provisioning unit according to claim 15, wherein the specific client context comprises environmental conditions, including at least one of:

location, weather, time of day, week and/or season, and ambient characteristics.

20. The service provisioning unit according to claim 15, wherein the processor is adapted to compose the selected service template based on client behaviour stored in a profile system or derived from previous service requests.

21. The service provisioning unit according to claim 15, wherein the processor is adapted to compose the selected service template for an individual client or for a group of clients.

22. The service provisioning unit according to claim 15, wherein the processor is further adapted to compose the selected service template based on client behaviour of a specific group of clients and offer the customised service to at least one individual client.

23. The service provisioning unit according to claim 15, wherein the processor is further adapted to compose the selected service template based on client behaviour of at least one individual client and offer the customised service to a specific group of clients.

24. The service provisioning unit according to claim 15, wherein the selected service template is valid for a plurality of different client contexts.

25. The service provisioning unit according to claim 15, wherein the processor is adapted to detect that the specific client context prevails by means of sensors providing raw context data related to the client activities of the at least one client.

26. The service provisioning unit according to claim 15, wherein the memory is adapted to record the history of client activities in a limited area by sniffing traffic in the limited area.

* * * * *